United States Patent [19]
Rayborn et al.

[11] Patent Number: 5,853,581
[45] Date of Patent: Dec. 29, 1998

[54] DRAIN BUCKET

[76] Inventors: Redrick D. Rayborn; Gerald Rayborn, both of 5100 Highpoint Rd., Apt 64, Union City, Ga. 30291

[21] Appl. No.: 834,016

[22] Filed: Apr. 11, 1997

[51] Int. Cl.6 .................................................. B01D 35/027
[52] U.S. Cl. ........................ 210/241; 210/419; 210/469; 210/470; 210/474
[58] Field of Search ................................ 210/241, 469, 210/474, 419, 470, 244, 464, 465; 4/630; D7/667; 99/495

[56] References Cited

U.S. PATENT DOCUMENTS

| | | | |
|---|---|---|---|
| 646,128 | 3/1900 | Price | 4/290 |
| 1,389,908 | 9/1921 | Shults et al. | 4/290 |
| 2,478,374 | 8/1949 | Danielson | 4/290 |
| 4,025,435 | 5/1977 | Shea | 210/469 |
| 4,265,766 | 5/1981 | Crossley | 210/474 |
| 4,372,448 | 2/1983 | Drach | 211/41 |
| 4,452,581 | 6/1984 | Panehal | 210/469 |
| 4,716,824 | 1/1988 | Hand et al. | 210/474 |
| 4,731,177 | 3/1988 | Hemman | 210/241 |
| 4,815,160 | 3/1989 | Smith, Jr. | 210/248 |

Primary Examiner—Matthew O. Savage
Attorney, Agent, or Firm—Patent & Trademark Services; Thomas Zack; Joseph H. McGlynn

[57] ABSTRACT

A colander like receptacle mounted over a portable liquid storage container. The container has a drain valve and may have casters to permit its rolling. Interlocking male fins in the receptacle engage slots in the container and are locked together by turning the receptacle relative to the container. A male retaining slot in the container adjacent the slot can lock the container and receptacle together when turned. After, the items such as dishes, glassware or other kitchen items, are placed in the receptacle are drained of their liquids, the drained liquids are stored in the container until sufficiently full. These stored liquids may be drained off to permit the containers reuse.

4 Claims, 1 Drawing Sheet

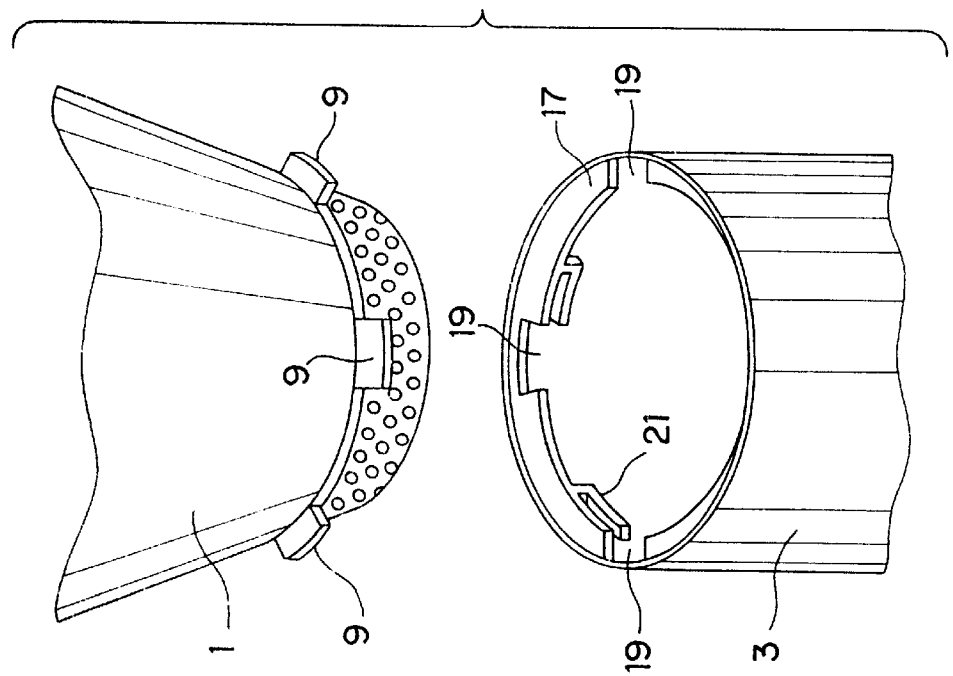
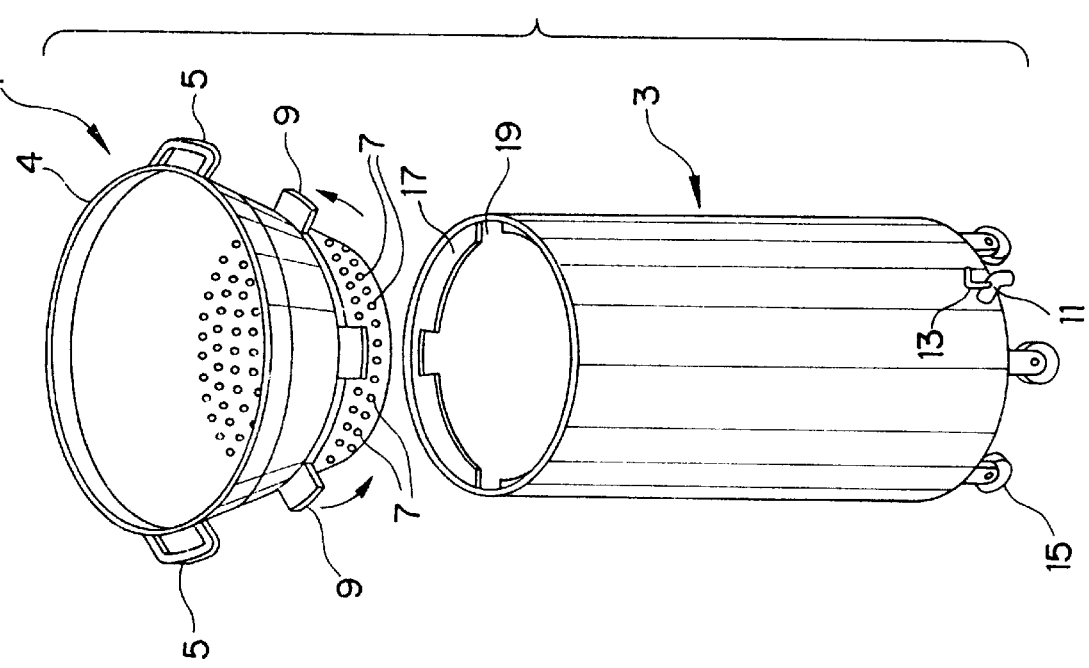

DRAIN BUCKET

BACKGROUND OF THE INVENTION

Over the years dish and glassware drainers of various descriptions and configurations have been used. Commonly used have been rack type wire or other strainers in which glasses, silverware and other items drain by gravity action to the sink in which placed. Unfortunately, in restaurants and homes the number of sinks available or available at a desired location are limited. The present invention seeks to overcome these deficiencies by providing for a portable water storage device over which a colander like bucket with the dish, glassware or other items can be placed. Provision is also made to allow easy disposal of the drained liquids such that it may be reused at any desired location as more fully described in this specification.

DESCRIPTION OF THE PRIOR ART

Many of the prior art dish, glassware and eating utensils have used different types of holders and drainage devices. For example, in U.S. Pat. No. 646,128 to Price a wire cage type of dish drainer with a center container for silverware is disclosed.

In U.S. Pat. No. 1,389,908 to Shults et al. a wire mesh dish drainer with a solid metal platform which rests over a sink is disclosed.

The sink strainer in the Danielson patent (U.S. Pat. No. 2,478,374) is triangular shaped with drain holes at one of the apexes.

In U.S. Pat. No. 4,372,448 to Drach a dish drainer with upstanding members to hold dishes is disclosed. The present invention differs from the known prior art by providing for a top mounted colander-like bucket or holding device for the items to be drained under which a second water portable container is placed as more fully described herein.

SUMMARY OF THE INVENTION

This invention relates to a top mounted colander-like receptacle with a plurality of holes under which a portable liquid storage container is placed. The lower container has a drain valve to drain stored liquids therefrom and may have rolling members to permit its movement. At the interface between the upper receptacle and lower container a male-female connector may be used to lock the two units together.

It is the primary object of the present invention to provide for an improved liquid drain receptacle and portable liquid storage container.

Another object is to provide for such a unit in which storage container liquids may be drained to permit its reuse.

These and other objects and advantages of the present invention will become apparent to readers from a consideration of the ensuing description and the accompanying drawings.

BRIEF DESCRIPTION OF THE DRAWINGS

FIG. 1 is an exploded perspective view of the invention's preferred embodiment.

FIG. 2 is an enlarged view of the interface between the upper liquid drainage receptacle and the lower container shown in FIG. 1.

DESCRIPTION OF THE PREFERRED EMBODIMENT

FIG. 1 is an exploded perspective view of the invention's preferred embodiment. A top mounted colander-like receptacle 1 is mounted over the lower portable liquid storage container 3. The receptacle 1 is frusto-conical or an abbreviated inverted cone in shape with an opened larger upper circular top rim 4. Two opposite top swivel side mounted handles 5 can be used to carry the receptacle and its contents. Extending through the receptacle's lower wall section are a series of drainage holes 7 which permit liquids to drain downwardly therefrom. Four (three shown) protruding fins or male connectors 9 are equally spaced around a connecting external rim at the receptacle's lower section near the uppermost of the drainage holes 7.

The liquid storage container 3 has an opened upper circular top complementary shaped to accept the receptacle's lower section. This container is shaped like an upright hollow cylinder and has a lower drainage valve 11. This valve has an internal non-drip ball valve operated by handle 13 similar to that found on conventional large coffee pots. Several optional rolling members, in this case the caster-like feet 15, may be fixed to bottom of the container to permit its easy rolling movement on a horizontal surface floor.

FIG. 2 is an enlarged view of the interface between the upper liquid drainage receptacle 1 and the lower liquid storage container 3. Located in the container's circular rim 17 are four equally spaced cut out slots 19 which act as female receiving units for the four male connector fins 9. These slots are made slightly larger than the fins and each has associated with it a lower side horizontal slotted member 21 which can receive a fin member after the fin is inserted into a slot and turned clockwise. This slotted member 21 acts to hold and lock the turned fin member 9 to prevent the upper mounted receptacle from becoming loose from the lower liquid container. By turning the connected upper receptacle counterclockwise it may be released from the lower container 3.

In use dishes, glassware, kitchen utensils, eating implements, or the like items are placed in the upper receptacle 1 usually in such a manner to insure the drainage of liquids from them. If they have recently been washed or rinsed, their liquid droplets will fall through the lower section holes 7 into the lower mounted liquid storage container 3. Once sufficiently full with liquid, the lower container 3 with or without the top mounted receptacle can be moved to a location where the stored liquid can be discharged through the valve 11. The drained container is then ready for reuse at the same or a different location in the restaurant or home.

The upper receptacle can be made of steel sheet metal using conventional metal stamping, forming and punching techniques. The formed sheet metal components are assembled and held together using conventional spot welding and soldering techniques. The final assembled receptacle can be galvanized dipped to keep it from rusting. As used herein the term metal stamping means a process whereby flat metal is formed between two parts of a die under tremendous pressure. the metal is punched, formed, and shaped to these dies, many times in one process. Metal punching is also a process which involves male and female dies, both of which are machined into the shape of the desired finished product. The dies are made of hardened tool steel, and are placed in the jaws of a hydraulic press. In operation, the steel material to be punched is placed between the two die components and the hydraulic press activated. The two die quickly punch out the desired shape from the sheet metal, producing the desired metal component. Galvanizing is a process which applies thin coats of zinc to finished products made of steel. The process involves dipping the receptacle 1 into molten zinc which reacts with the steel to form a brittle zinc/iron alloy.

Although the invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as our invention is:

1. A colander-like receptacle combined with a portable liquid storage container comprising:

an upper receptacle with a plurality of lower liquid drainage holes therein, said receptacle having protruding members located on its lower exterior surface which can engage slots in a lower portable liquid storage container; and a lower portable liquid storage container with protrusion receiving slots mounted under said receptacle, said container having a liquid drain valve to drain stored liquids therefrom and lower rolling members to permit the movement of the container along an underlying surface.

2. The invention as claimed in claim 1, wherein said lower container has the same number of slots as the receptacle has protruding members.

3. The invention as claimed in claim 2, also including locking means located adjacent to said lower container's slots for locking said receptacle to said container when its protruding members are inserted into the slots and turned.

4. The invention as claimed in claim 3, also including side mounted handles on the upper receptacle.

* * * * *